Patented July 23, 1946

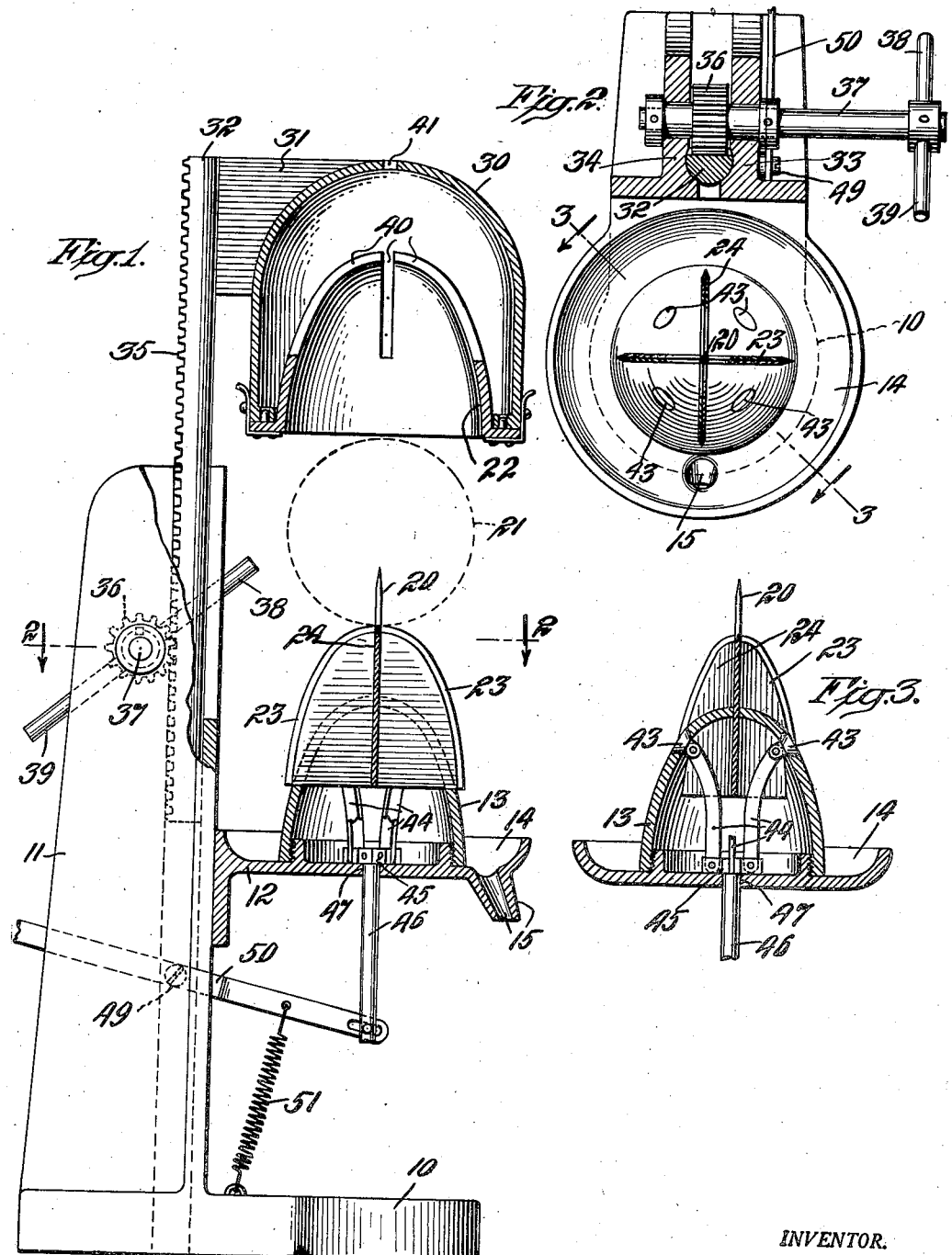

2,404,382

UNITED STATES PATENT OFFICE 2,404,382

FRUIT CUTTER AND SQUEEZER

Robert A. Klein, New York, N. Y., assignor of one-half to Abraham Kraus, Brooklyn, N. Y.

Application April 21, 1944, Serial No. 532,032

9 Claims. (Cl. 100—42)

This invention relates to a machine for extracting the juice from fruit, such as oranges or lemons.

In the usual squeezer the fruit is first cut in half and then the two halves are squeezed separately.

This invention has for its object to provide a machine so constructed and arranged that the fruit will be cut and squeezed in one operation.

Another object of the invention is to provide a machine of the character described having means for ejecting the squeezed skins from the squeezer after the squeezing operation has been completed.

Further objects of the invention will appear from the following specification taken in connection with the drawing which forms a part of this application, and in which Fig. 1 is a vertical sectional elevation of a device constructed in accordance with the invention;

Fig. 2 is a transverse sectional plan taken substantially on line 2—2 of Fig. 1 and looking in the direction of the arrows; and Fig. 3 is a sectional elevation taken substantially on line 3—3 of Fig. 2, looking in the direction of the arrows.

In the particular embodiment of the invention illustrated there is shown a standard having a base 10 and a vertical bracket or pedestal 11. The squeezing apparatus comprises a bracket or base 12 fixed to the upright 11 and having a cone or fixed conical member 13 secured thereto and extending upwardly therefrom. The base 12 has a circular trough 14 formed therein having an outlet spout 15 for conducting the juice therefrom. The fixed conical member 13 has projecting upwardly from the top thereof and axially disposed thereon, a spike or pin 20 for supporting an orange 21 or other fruit.

In order to cut the fruit into sections before it is squeezed between the base or fixed cone 13 and a movable cone 22, knives 23 and 24 are supported on the fixed cone 13 and are disposed above this cone in position to be engaged by the fruit as the fruit is pushed downwardly by the downward movement of the movable cone 22. The knives 23 and 24 intersect at the axis of the cone 13 or at the pin 20 and, as shown in Fig. 2, are arranged to form a cross, in plan view, thus dividing the fruit into four sections. It will be understood, of course, that by providing further knives which will intersect at the same point, the fruit can be cut into a greater number of sections.

The movable cone 22 is carried by a casing 30 which in turn is mounted on a bracket 31 to which is secured a vertical rack bar 32 which is slidably mounted in guide ways 33 and 34 formed in the standard or pedestal 11. The rack teeth 35 of the rack bar 32 mesh with a gear 36 which is mounted on a spindle 37 rotatably carried by the standard 11. Any suitable rotating means for the spindle 13 may be provided, such as the handles 38 and 39, or a crank may be used if desired.

The cone 22 has formed therein slots 40 disposed in alinement with the knives 23 and 24 to permit the passage of these knives through the cone as the cone 22 is moved downwardly over the cone 13. An opening 41 receives the pin 20.

In order to eject the skins from the fixed cone 13 after the squeezing operation has been completed, a plurality of ejecting members 43 are mounted in the cone 13, these members being normally disposed with their outer surfaces flush with the outer surface of the cone. Each of the members 43 has secured thereto and extending downwardly therefrom a link 44, these links having their lower ends pivotally mounted in a collar 45 mounted on the upper end of a downwardly extending rod 46 which is slidably mounted in a bearing 47 formed in the base 12 which supports the cone 13. A lever 50 is mounted on a pivot 49 on pedestal 11 and is pivoted to the lower end of the rod 46 and a spring 51 normally holds the lever in the position shown in Fig. 1.

In order to eject the skins from the cone 13 the outer end of the lever 50 is depressed to exert upward pressure and cause the ejectors 43 to move outwardly through the cone 13 and eject the skins therefrom.

From the foregoing specification it will be clear that a simple and practical squeezing device has been designed in such a manner that the whole fruit may be cut and squeezed thereon in one continuous operation without necessitating the cutting of the fruit into halves. Furthermore, after the squeezing operation has been completed, the skins can be easily and quickly ejected, thus again placing the device in condition for immediate use.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. A fruit squeezer comprising a conical base member, a concave member adapted to coact therewith to squeeze the fruit, means to move one member toward the other into operative relation thereto, and knives mounted on the base member and having their lower ends disposed above the lower end of the base member and intersecting at the axis of said base member and extending to a point above said base member for cutting the fruit prior to the squeezing operation, said concave member having slots for receiving said knives and allowing said knives to pass therethrough.

2. A fruit squeezer comprising a conical base member, a concave member mounted coaxially therewith and adapted to coact therewith to squeeze the fruit, means to move one member axially on the common axis toward the other into operative relation thereto for squeezing the juice from fruit disposed between said members, and ejector arms mounted in the base member and movable therethrough at points below the apex thereof for ejecting fruit skins from the base member.

3. A fruit squeezer comprising a conical base member, a concave member mounted coaxially therewith and adapted to coact therewith to squeeze the fruit, means to move one member axially on the common axis toward the other into operative relation thereto, a knife mounted on the base member and having its lower end disposed above the lower end of the base member with its upper end extending to a point above said base member for cutting the fruit prior to the squeezing operation, and means associated with said base member for ejecting therefrom fruit skins, after the squeezing operation has been completed.

4. A fruit squeezer comprising a conical base member, a concave member mounted coaxially therewith and adapted to coact therewith to squeeze the fruit, means to move one member toward the other into operative relation thereto, knives mounted on the base member and having their lower ends disposed above the lower end of the base member and intersecting at the axis of said base member and extending to a point above said base member for cutting the fruit prior to the squeezing operation, said knives extending radially and downwardly with respect to the base member, and means associated with said base member for ejecting fruit skins therefrom after the squeezing operation has been completed.

5. A fruit squeezer comprising a conical base member, a concave member adapted to coact therewith to squeeze the fruit, means to move one member toward the other into operative relation thereto, and knives mounted on the base member and having their lower ends disposed above the lower end of the base member and extending to a point above said base member for cutting the fruit prior to the squeezing operation, said knives extending radially and downwardly relative to the base member and said concave member having slots to receive the knives after the cutting operation.

6. An expressing device comprising a stationary support, a substantially conical member mounted thereon and having on the upper end thereof pairs of knives, each pair having oppositely arced knife edges, the width of a pair of knives at their bases corresponding to the width of the conical member at its base and the bases of the knives being spaced from the base of the conical member a distance equal to substantially half of the height of the conical member, and a concave member adapted to coact with the conical member and being movable toward and away from the conical member.

7. An expressing device comprising a stationary support, a stationary pressing member thereon having a circular base and circular sections in planes parallel to the base throughout its height, pairs of knives mounted on said pressing member, the knives of one pair lying in a plane at right angles to the other pair, the bases of the knives lying in a plane intersecting the stationary pressing member at a height at least greater than one-quarter the distance of the length of the pressing member, and a second member adapted to cooperate with the pressing member and being movable toward and away from the pressing member.

8. A pressing element of an expressing device comprising a stationary support, and a substantially conical member mounted thereon and having on the upper end thereof pairs of knives, each pair having oppositely arced knife edges, the width of a pair of knives at their bases corresponding to the width of the conical member at its base and the bases of the knives being spaced from the base of the conical member a distance equal to substantially half of the height of the conical member.

9. A pressing element of an expressing device comprising a stationary support, a stationary pressing member thereon having a circular base and circular sections in planes parallel to the base throughout its height, and pairs of knives mounted on said pressing member, the knives of one pair lying in a plane at right angles to the other pair, the bases of the knives lying in a plane intersecting the stationary pressing member at a height at least greater than one-quarter the distance of the length of the pressing member.

ROBERT A. KLEIN.